United States Patent [19]

D'Anvers et al.

[11] Patent Number: 5,385,999
[45] Date of Patent: Jan. 31, 1995

[54] POLYSILOXANES HAVING FLUOROALIPHATIC- AND CARBOXYL-CONTAINING TERMINAL GROUPS, THEIR PREPARATION, AND THEIR USE IN TREATMENT OF FIBROUS SUBSTRATES

[75] Inventors: Claude D'Anvers; Dirk M. Coppens, both of Brussels, Belgium

[73] Assignee: Minnesota Mining and Manufacturing Company, St. Paul, Minn.

[21] Appl. No.: 147,338
[22] Filed: Nov. 3, 1993

[30] Foreign Application Priority Data

Dec. 1, 1992 [DE] Germany ............... 4240274

[51] Int. Cl.$^6$ ................. C08G 77/06
[52] U.S. Cl. ........... 528/21; 528/25; 528/27; 528/28; 528/29; 528/41; 528/42; 556/429; 556/439; 427/387; 427/389; 69/30
[58] Field of Search .......... 528/41, 42, 29, 28, 528/27, 25, 21; 556/439, 429; 427/389, 387; 69/30

[56] References Cited

U.S. PATENT DOCUMENTS

| Re. 30,337 | 7/1980 | Loudas . |
|---|---|---|
| 2,666,797 | 1/1954 | Husted et al. . |
| 2,803,656 | 8/1957 | Ahlbrecht et al. . |
| 2,894,991 | 7/1959 | Ahlrect et al. . |
| 2,915,554 | 12/1959 | Ahlbrecht et al. . |
| 2,961,470 | 11/1960 | Sheppard . |
| 2,965,677 | 12/1960 | Harris . |
| 3,088,849 | 5/1963 | Friedlander . |
| 3,172,190 | 3/1965 | Beach . |
| 3,462,296 | 8/1969 | Reynolds et al. . |
| 3,484,281 | 12/1969 | Guenthner et al. . |
| 3,544,663 | 12/1970 | Hamptsthelm et al. . |
| 3,655,732 | 4/1973 | Rondestvedt . |
| 3,816,167 | 6/1974 | Schultz et al. . |
| 3,923,715 | 12/1975 | Dettre et al. . |
| 3,935,277 | 1/1976 | Dear et al. . |
| 3,944,527 | 3/1976 | McCown . |
| 4,024,178 | 5/1977 | Landucci . |
| 4,043,964 | 8/1977 | Sherman et al. . |
| 4,098,742 | 7/1978 | Mueller . |
| 4,107,055 | 8/1978 | Sukornick et al. . |
| 4,158,672 | 6/1979 | Dear et al. . |
| 4,160,777 | 7/1979 | Loudas . |
| 4,190,545 | 2/1980 | Marshall et al. . |
| 4,215,205 | 7/1980 | Landucci . |
| 4,264,484 | 4/1981 | Patel . |
| 4,325,857 | 4/1982 | Champaneria et al. . |
| 4,388,372 | 6/1983 | Champaneria et al. . |
| 4,419,298 | 12/1983 | Falk et al. . |
| 4,426,476 | 1/1984 | Chang . |
| 4,525,305 | 6/1985 | Patel . |
| 4,539,006 | 9/1985 | Langford . |
| 4,625,010 | 11/1986 | Huhn et al. . |
| 4,709,074 | 11/1987 | Bathelt et al. . |
| 4,748,225 | 5/1988 | Yoshioka et al. ............ 528/29 |
| 4,778,915 | 10/1988 | Lina et al. . |
| 4,782,175 | 11/1982 | Wehowsky et al. . |
| 4,898,981 | 2/1990 | Falk et al. . |
| 4,920,190 | 4/1990 | Lina et al. . |
| 5,026,910 | 6/1991 | Bollens et al. . |

FOREIGN PATENT DOCUMENTS

| 73732 | 3/1983 | European Pat. Off. . |
|---|---|---|
| 298364A2 | 1/1989 | European Pat. Off. . |
| 299596A2 | 1/1989 | European Pat. Off. . |
| 324354A1 | 7/1989 | European Pat. Off. . |
| 415204A2 | 3/1991 | European Pat. Off. . |
| 0458742A1 | 11/1991 | European Pat. Off. . |
| 3802633A1 | 8/1989 | Germany . |
| 81-49081 | 9/1979 | Japan . |
| 2010874A | 7/1979 | United Kingdom . |

OTHER PUBLICATIONS

Banks, RE, Ed. "Organofluorine Chemicals and Their Industrial Applications," pp. 226–230 (Ellis Harwood, Ltd., West Sussex, England, 1979).

"Chemistry and Technology of Silicones," by Walter Noll, Academic Press, New York, pp. 585–603 (1968).

L. Schlosser "Eigenschaften Fluororganischer Verbindungen und Ihre Anwendung auf dem Ledergebiet," DAS LEDER, 41 Jahrgang Aug. 1990, pp. 149–153. (Translation will be forwarded).

Primary Examiner—Melvyn I. Marquis
Attorney, Agent, or Firm—Gary L. Griswold; Walter N. Kirn; Robert H. Brink

[57] ABSTRACT

This invention relates to polysiloxanes having fluoroaliphatic- and carboxyl- containing terminal groups, their preparation and their use in imparting water-, oil- and soil-repellency and a soft hand to fibrous substrates such as leather, and to the resulting treated substrate.

17 Claims, No Drawings

POLYSILOXANES HAVING FLUOROALIPHATIC- AND CARBOXYL-CONTAINING TERMINAL GROUPS, THEIR PREPARATION, AND THEIR USE IN TREATMENT OF FIBROUS SUBSTRATES

This invention relates to polysiloxanes having fluoroaliphatic- and carboxyl- containing terminal groups, their preparation and their use in imparting water-, oil- and soil-repellency and a soft hand to fibrous substrates such as leather, and to the resulting treated substrate.

During recent years the fashion in leather in general shifted towards full-grain leathers, which feel soft, that is, have a "soft hand". Full-grain leather is not protected by a coating. The maintenance of full-grain leather is more difficult than the maintenance of finished or coated leather. In order to facilitate the maintenance of full grain as well as suede leathers a fluorochemical treatment can be applied.

Typically the fluorochemical is applied as a spray treatment or as a wet treatment (a so-called "drum treatment") at the final stages of the leather tanning process. The drum application method is often preferred because the durability of the fluorochemical protection is better with a drum treatment than with a spray treatment. A major disadvantage -of the known fluorochemical drum treatments is that the hand or softness of the leather is adversely affected, the fluorochemical treatment imparts a harsh, dry hand to the leather. A number of fluorochemical compositions have been proposed for such treatment and several are commercially used for that purpose, such as those sold under the tradename "Scotchgard Leather Protector".

Various patents and publications disclose a variety of such fluorochemical compositions for various uses, e.g. U.S. Pat. Nos. 3,462,296 (Reynolds et al.), 3,484,281 (Guenthner at al.), 3,816,167 (Schultz et al.), 3,944,527 (McCown), 4,024,178 (Landucci), 4,190,545 (Marshall et al.), 4,215,205 (Landucci) and 4,426,476 (Chang), Japanese published patent application (Kokai) No. 81-49081, and Banks, R. E., Ed., "Organofluorine Chemicals and their Industrial Applications", pages 226–230 (Ellis Harwood, Ltd., West Sussex, England, 1979). Also various patents disclose carpet treating compositions containing, inter alia, various fluorochemicals, e.g. U.S. Pat. Nos. 3,923,715 (Dettre et al.), 4,043,964 (Sherman et al.), 4,107,055 (Sukornick et al.), 4,264,484 (Patel), Re 30,337 (Loudas), 4,388,372 (Champaneria) and 4,325,857 (Champaneria). Also various patents and publications disclose the use of fluorochemical compositions on leather, e.g. U.S. Pat. Nos. 4,525,305 (Patel), 4,920,190 (Lina et al.), 4,782,175 (Wehowsky et al.), 4,778,915 (Lina et al.), 4,539,006 (Langford), 3,923,715 (Dettre et al.), 4,709,074 (Bathelt et al.) and L. Schlosser "Eigenschaften fluororganischer Verbindungen und ihre Anwendung auf dem Ledergebiet", DAS LEDER, 41 Jahrgang August 1990, pages 149–153.

Silicones or polymeric siloxanes, such as the industrially available polyorganosiloxanes, like polymethylsiloxanes, are also known to impart water repellency to leather, textiles, and paper. See for example "Chemistry and Technology of Silicones" by Walter Noll, Academic Press, New York, p. 585–603 (1968).

European Patent Application 299 596 A2 describes a fiber treatment composition based on a microemulsion of carboxy-modified organopolysiloxane having at least two carboxyl groups in each molecule and use of the composition in the treatment of natural fibers such as wool, silk or cotton. The carboxyl-modified organopolysiloxane has the general formula $A(R_2SiO_2)_x (RASiO_2)_y R_2SiA$ where R is a monovalent hydrocarbon group, A can be, interalia, a substituted alkyl group such as 3,3,3-trifluoropropyl or a carboxyl group having the formula R'COOH where R' is a divalent organic group, $x=0$ to 2000, y is 0 to 200, $x+y=350$ to 2000. This organopolysiloxane is said to function by imparting durable softness, smoothness, wrinkle resistance, and compression recovery to fibrous materials without the generation of oil spots.

European Patent Application 298 364 A2 describes fluoro- and polysiloxane-containing urethanes and their use for implementing oil- and water-repellency as well as a soft hand to leather. The urethanes are prepared by reaction of the fluoroalcohol isocyanate adduct with a polysiloxane in a ratio of 1 to 2 mol at a temperature of 30° to 130° C. Perfluoroaliphatic group containing polyurethanes with similar properties are also described in DE-38 02 633 A1.

U.S. Pat. No. 4,625,010 teaches the use of organopolysiloxanes having SiC bonded epoxy groups, which may be applied to fiber with a polymer having perfluoroalkyl groups.

U.S. Pat. No. 4,098,742 (Mueller) teaches a process for the preparation of certain polyurethanes which contain at least one segment derived from a perfluoroalkyl-substituted diol and at least one segment derived from a reactive hydrogen-containing polysiloxane which are synthesized by co-polycondensation with an organic di- and especially textiles, to which they impart a high degree of oil- and water-repellency.

European Patent Application 0 324 345 A1 relates to a process making leather, leather substitutes and pelts hydrophobic with a carboxyl group-containing polysiloxane whose carboxylic groups are present in neutralized form. Preferred are those polysiloxanes which contain terminal carboxylic anhydride groups. The anhydride groups of the polysiloxanes can be reacted with amines or alcohols to give esters or partial esters.

European Patent Application 0 415 204 A2 describes certain anhydride-functional organo(poly)siloxanes which are useful, for example, as curing agents for epoxy-resin materials.

This invention, in one aspect, provides a novel class of functional polysiloxanes having a fluoroaliphatic radical- and carboxyl-containing terminal moiety bonded to a diorganosiloxy group and either another such terminal moiety bonded to another diorganosiloxy group or a cyclic carboxylic acid anhydride-containing terminal moiety bonded to another diorganosiloxy group, and carboxylic acid derivatives of said polysiloxanes.

In another aspect, the invention provides polyorganosiloxanes having a,ω-bis(fluoroaliphatic radical- and carboxyl-containing) moiety and derivatives thereof. These polysiloxanes can be used to make treating compositions useful in treating substrates such as leather to impart water- and oil-repellency and a soft hand thereto.

In a preferred embodiment the fluoroaliphatic- and carboxyl-polyorganosiloxanes of this invention are a,ω-bis (polydialkylsiloxane) dicarboxylic acid esters, thioesters or amides of fluoroaliphatic (e.g. perfluoroalkyl) group-containing monofunctional alcohols, mercaptans, or amines, respectively. The free carboxyl groups of the amide, thioester or ester according to the invention can be reacted with a base or ammonia to form a salt, which can be dispersed in water to form an aqueous solution useful in treating fibrous substrates such as leather to impart water- and oil-repellency and a soft hand thereto. Especially preferred fluoroaliphatic- and carboxylpolyorganosiloxanes of this invention, such as the aforesaid esters, thioesters or amides, are those according to the formulas I and II

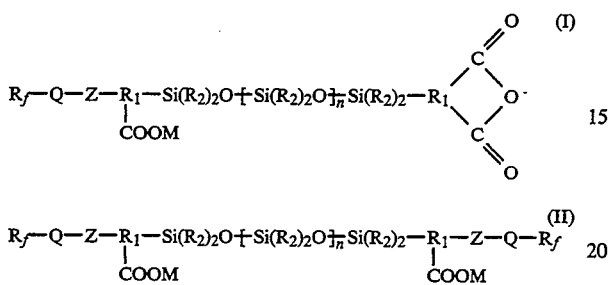

wherein
$R_f$ represents a fluoroaliphatic group;
Q represents a covalent bond or a linking group;
Z is

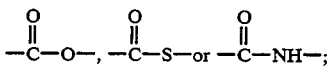

each $R_1$ and $R_2$ is independently a linear, branched or cyclic aliphatic group or an aromatic group;
n is an integer greater than 1 and preferably is 10 to 100;
M is H, Na, K, Li, $NR_3R_4R_5R_6$ with $R_3$, $R_4$, $R_5$, $R_6$ being H, a linear, branched or cyclic saturated aliphatic group or an aromatic group, $R_3$-$R_6$ can contain functional groups such as hydroxy groups.

The fluoroaliphatic group, represented in formula I and II as, $R_f$, is a stable, inert, non-polar, preferably saturated, monovalent moiety which is both oleophobic, and hydrophobic, preferably contains at least about 3 carbon atoms, more preferably 4 to about 20 carbon atoms and most preferably about 6 to 12 carbon atoms, can be straight chain, branched chain, or cyclic and is preferably free of polymerizable olefinic unsaturation, and can optionally contain catenary heteroatoms such as oxygen, divalent or hexavalent sulfur, or nitrogen. It is preferred that each fluoroaliphatic group contains about 40% to about 78% fluorine by weight. The terminal portion of the fluoroaliphatic group contains a fully-fluorinated terminal group. This terminal group preferably contains at least 7 fluorine atoms, e.g., $CF_3CF_2CF_2$—, $(CF_3)_2CF$—, —$CF_2SF_5$, or the like. Perfluorinated aliphatic groups, e.g., those of the formula $C_xF_{(2x+1)}$, are the most preferred embodiments of the fluoroaliphatic group, where x is at least 3, preferably 4 or greater, and can be as high as 20.

Linking group Q can be a covalent bond, or, a moiety containing at least 1 carbon atom, preferably, a moiety containing 1 to about 20 carbon atoms and optionally oxygen, nitrogen, or sulfur heteroatoms, and preferably is free of active hydrogen atoms. Examples of structures suitable for linking group Q include straight chain, branched chain, or cyclic alkylene, arylene, aralkylene, oxy, oxo, thio, sulfonyl, sulfinyl, imino, sulfonamide, carboxamido, carbonyloxy, iminocarboxyalkylene, ureylene-di and combinations thereof such as sulfonamidoalkylene.

Preferred linking groups, Q, can be selected according to ease of preparation and commercial availability. Below is a representative list of suitable organic Q groups. For the purposes of this list, each k is independently an integer from 1 to about 20, g is an integer from 0 to about 10, h is an integer from 1 to about 20, R' is hydrogen, phenyl, or an alkyl of 1 to about 4 carbon atoms (and is preferably methyl), and R'' is alkyl of 1 to about 20 carbon atoms.

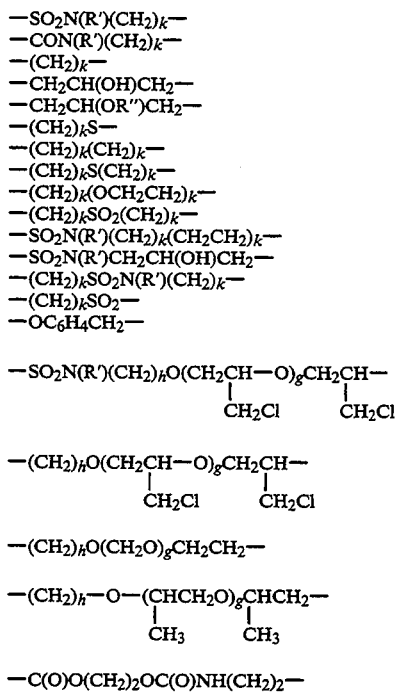

Q is preferably alkylene, sulfonamide, or sulfonamidoalkylene.

In a preferred embodiment of the invention, the organic linking group Q is —R'— or —$SO_2N(R)R'$—, where R is hydrogen or an alkyl group such as an alkyl with, for example, 1 to 6 carbon atoms, and R' is an alkylene group having, for example, 1 to 15 carbon atoms.

In a preferred embodiment $R_1$ is a branched, linear, or cyclic aliphatic group having, for example, 2 to 10 carbon atoms.

The silicon bonded $R_2$ in formulas I and II are, for example, methyl, ethyl, n-propyl, isopropyl or phenyl groups. The subscript n in formulas I and II is most preferably 20-60.

In a preferred embodiment the polyorganosiloxanes of this invention are

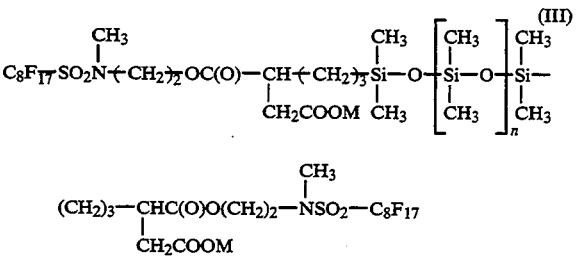

-continued

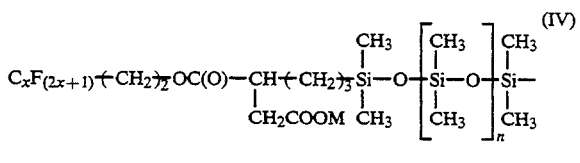

wherein
n is 20 to 60,
M is as described in formulas I and II and
x is 6 to 14.
Preferably x is 8.

The fluoroaliphatic- and carboxylpolyorganosiloxanes according to the invention can be prepared by reaction of a polyorganosiloxane-substituted dicarboxylic anhydride with a fluoroaliphatic group-containing alcohol, mercaptan or amine.

In the process of this invention, the reaction between the polyorganosiloxane-substituted dicarboxylic anhydride and the fluoroaliphatic group-containing alcohol can be done neat, in the melt, or can be carried out in a solvent that is inert to the reactants and catalyst, and which solubilizes the reactants and the catalyst at the reaction temperature. A useful solvent is for example toluene.

In the process of this invention, the reaction can be carried out without a catalyst, or in the presence of any catalyst which is capable of promoting the reaction between the dicarboxylic anhydride and the fluoroaliphatic group-containing alcohol, amine -or mercaptan. Examples of such catalysts are pyridine or 4-(dimethylamino)-pyridine.

The process of this invention for preparing the specific polyorganosiloxanes can be carried out at any temperature and pressure at which the reaction between the dicarboxylic anhydride and the alcohol, amine or mercaptan proceeds. The process is preferably conducted at temperatures from 50° to 150° C. and at atmospheric pressure.

The minimum amount of fluoroaliphatic group-containing alcohol, amine or mercaptan required to react with the polyorganosiloxane-substituted dicarboxylic anhydride is chosen in function of the desired repellency and hand properties of the final product. Preferably at least 50% of the dicarboxylic anhydride groups are reacted with the fluoroaliphatic group-containing reactant.

Once the reaction is completed, the solvent, if used, is preferably evaporated off.

In a preferred embodiment, the resulting fluoroaliphatic- and carboxyl-containing polyorganosiloxanes are partially or completely neutralized with an alkaline substance, preferably ammonia, to form salts.

Monofunctional fluoroaliphatic alcohols useful in the above described reaction with the anhydride in preparing the polysiloxanes of this invention include the N-alkanol perfluoroalkylsulfonamides described in U.S. Pat. No. 2,803,656 (Ahlbrecht et al.), which have the general formula $R_fSO_2N(R)R_1CH_2OH$ wherein $R_f$ is a perfluoroalkyl group (including perfluorocycloalkyl) having 4 to 10 carbon atoms, $R_1$ is an alkylene radical having 1 to 12 carbon atoms, and R is a hydrogen atom or an alkyl group containing 1 to 4 carbon atoms and is preferably methyl. These monofunctional alcohols can be prepared by reactions of an acetate ester or halohydrin with a sodium or potassium salt of the corresponding perfluoroalkanesulfonamide.

Illustrative of the fluoroaliphatic alcohols are the following:

N-ethyl-N-(2-hydroxyethyl)-perfluorooctanesulfonamide,
N-propyl-N-(2-hydroxyethyl)-perfluorooctanesulfonamide,
N-ethyl-N-(2-hydroxyethyl)-perfluorodecanesulfonamide,
N-ethyl-N-(2-hydroxyethyl)-perfluorododecanesulfonamide,
N-ethyl-N-(2-hydroxyethyl)-perfluorocyclohexylethanesulfonamide,
N-propyl-N-(2-hydroxyethyl)-perfluorobutylcyclohexanesulfonamide,
N-ethyl-N-(2-hydroxyethyl)-perfluoro-4-dodecylcyclohexanesulfonamide,
N-ethyl-N-(2-hydroxyethyl)-perfluoro-2-methylcyclohexanesulfonamide,
N-ethyl-N-(6-hydroxyhexyl)-perfluorooctanesulfonamide,
N-methyl-N-(11-hydroxyundecyl)-perfluorooctanesulfonamide,
N-methyl-N-(4-hydroxybutyl)-perfluorobutanesulfonamide,
N-(2-hydroxyethyl)-perfluorooctanesulfonamide,
N-methyl-N-(2-hydroxyethyl)-perfluorooctanesulfonamide.

Still other alcohols useful in said reaction with anhydride preparing the polysiloxanes of the invention include the perfluoroalkyl-substituted alkanols of the formula $C_nF_{2n+1}CH_2OH$, where n is 4 to 10 (e.g., $C_4F_9CH_2OH$), described, for example, in U.S. Pat. No. 2,666,797 (Husted et al.), and of the formula $R_f(CH_2)_mOH$ where $R_f$ is a perfluoroalkyl radical having from 4 to 10 carbon atoms and m is an-integer from 1 to 4, e.g.

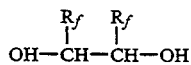

Perfluoroalkyl-substituted alkanols, e.g., $C_nF_{2n+1}(C_mH_{2m-2})OH$ where n is 4 to 10 and m is 1 to 4, e.g., $C_8F_{17}CH=CHCH_2OH$, can also be used in preparing polysiloxanes of this invention. Further useful monofunctional alcohols include the N-(hydroxypoly(oxyalkylene))-perfluoroalkanesulfonamides of U.S. Pat. No. 2,915,554 (Ahlbrecht at al.), such as

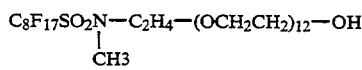

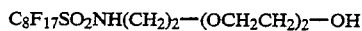

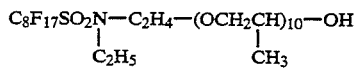

Other alcohols which can be used in the reaction with the anhydride preparing the polysiloxanes of this invention are, e.g. those of the formula $(R_fCH_2CH_2S)_2C(CH_3)CH_2CH_2OH$ described in U.S. Pat. No. 4,419,298 (Falk et al.), and e.g. $HO—CH_2C(CH_2SCH_2CH_2R_f)_2CH_2OH$ described in U.S. Pat. No. 4,898,981 (Falk et al.). Other alcohols which can be used in preparing the polysiloxanes of this invention are e.g. those of the formula:

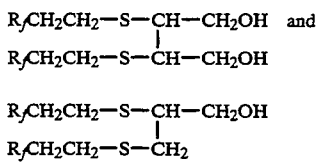

described in U.S. Pat. No. 3,935,277 and U.S. Pat. No. 4,158,672.

Illustrative perfluoroalkyl mercaptans useful in the above described reaction with the polysiloxane substituted acid anhydride to prepare the polysiloxanes of this invention include, for example, mercaptans of the formula $R_f$—$R_1$—SH described in a number of U.S. patents including U.S. Pat. Nos. 2,894,991; 2,961,470; 2,965,677; 3,088,849; 3,172,190; 3,544,663 and 3,655,732; the latter patent discloses mercaptans where $R_f$ is a perfluoroalkyl and $R_1$ is an alkylene of 1 to 16 carbon atoms.

Illustrative fluoroaliphatic amines useful in the reaction with the anhydride preparing the polysiloxanes of this invention include fluoroalkylamines which have e.g. the general formula $R_f(CH_2)_2NH_2$ as described in U.S. Pat. No. 5,026,910 (Bollens et al.).

Polysiloxane-substituted dicarboxylic acid anhydrides which can be reacted with the aforementioned fluoroaliphatic alcohols, mercaptans and amines to prepare the polysiloxanes of this invention are described, for example, in said European Patent Application 0415204 A2.

Preferred polydialkylsiloxane—substituted dicarboxylic acid anhydrides have this structure

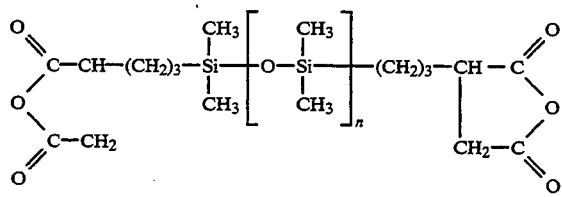

with n being an integer greater than 1 and preferably being 10–100.

Other representative examples of anhydride—substituted polydialkylsiloxanes are described in said European Patent No. 415 204.

Bases useful in preparing the treating compositions according to this invention are for example, NaOH, KOH, LiOH, NH$_4$OH, and amines such as NH$_2$CH$_2$CH$_2$OH
NH(CH$_2$CH$_2$OH)$_2$
N (CH$_2$CH$_2$OH)$_3$
N (CH$_2$CH$_3$)$_3$
NH (CH$_2$CH$_3$)$_2$
N (CH$_2$CH$_2$CH$_2$CH$_3$)$_3$

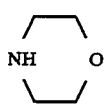

Other useful bases which can be used are described, for example, in European Patent No. 73,732.

The polysiloxanes of this invention are preferably produced as concentrated aqueous solutions or aqueous emulsions. Generally, the aqueous polysiloxane solutions or dispersions of this invention contain about 5 to 50% by weight of the active composition. In this form the polysiloxanes of this invention can easily be diluted with water before they are added to the tanning drum.

In order to prepare the concentrated polysiloxane solutions of this invention, environmentally-acceptable water-miscible organic solvents can be used, such as solvents which are less hazardous or have low toxicity, such as solvents classified in Germany according to class II or class III of the German emission control regulation (TA-Luft). Useful organic solvents which can be used to prepare the aqueous polysiloxane solutions of this invention are those which are at least partially water-miscible such as alcohols, ketones or water-miscible ethers (e.g. diethylene glycol diethylether, diethylene glycol dimethylether, propylene glycol dimethylether), water-miscible glycol ethers (e.g. propylene glycol monomethylether, propylene glycol mono ethylether, propylene glycol monopropylether, propylene glycol monobutylether, ethylene glycol monobutylether, dipropylene glycol monomethylether, dipropyleneglycoldimethylether, diethyleneglycol monobutylether), low esters of monoalkylethers of ethyleneglycol or propylene glycol (e.g. propylene glycol monomethyl ether acetate), many of which are commercially available.

Mixtures of organic solvents can be used to prepare the aqueous polysiloxane solutions of this invention.

The amount of polysiloxane of this invention applied to the substrate in accordance with this invention is chosen so that sufficiently high or desirable water- and oil repellencies are imparted to the substrate surface, said amount usually being such that 0.01% to 5% by weight, preferably 0.05 to 2% by weight, of fluorine is present on the treated substrate. The amount which is sufficient to impart desired repellency and soft hand can be determined empirically and can be increased as necessary or desired.

The fluoroaliphatic- and carboxyl-containing polysiloxanes of this invention are particularly useful for imparting water-, oil-, and soil- repellency and a soft hand to leather, and these properties can be imparted by a drum treatment of the leather during the tanning process of the leather.

Various adjuvants may be incorporated into the polysiloxanes of this invention to impart special properties thereto, for example, hydrocarbon extenders can be added for soil resistance or water repellency; also fat liquors or synthetic tanning agents can be added. Also other oil- and water repellent fluorochemical substances can be added to the composition to enhance the ability of the composition of this invention to impart desired surface properties to the treated fibrous porous substrates.

In the following nonlimiting examples, objects and advantages of this invention are illustrated, where all parts and percentages are by weight unless otherwise noted. In the examples where the polysiloxanes of this invention are applied to various substrates, the following test methods are used for evaluation.

Spray Rating

The spray rating (SR) of a treated substrate is a value indicative of the dynamic repellency of the treated substrate to water that impinges on the treated substrate, such as encountered by apparel in a rainstorm.

The rating is measured by Standard Test Number 22, published in the 1977 Technical Manual and Yearbook of the American Association of Textile Chemists and Colorists (AATCC), and is expressed in terms of the "spray rating" of the tested substrate. The spray rating is obtained by spraying water on the substrate and is measured using a 0 to 100 scale where 100 is the highest possible rating. In general, a spray rating of 70 or greater is desirable.

Oil Repellency

The oil repellency (OR) of a treated substrate is measured by the American Association of Textile Chemists and Colorists (AATCC) Standard Test Method No. 118-1983, this test is based on the resistance of a treated substrate to penetration by oils of varying surface tensions. Treated substrates resistant only to Nujol ™ mineral oil (the least penetrating of the test oils) are given a rating of 1, whereas treated substrates resistant to heptane (the most penetrating of the test oils) are given a rating of 8. Other intermediate values are determined by use of other pure oils or mixtures of oils, as shown in the following table.

STANDARD TEST LIQUIDS

| AATCC Oil Repellency Rating Number | Composition |
| --- | --- |
| 1 | Nujol ™ mineral oil |
| 2 | 65:35 Nujol ™ : hexadecane by volume at 70° F. (21° C.) |
| 3 | n-hexadecane |
| 4 | n-tetradecane |
| 5 | n-dodecane |
| 6 | n-decane |
| 7 | n-octane |
| 8 | n-heptane |

The rated oil repellency corresponds to the most penetrating oil (or mixture of oils) which does not penetrate or wet the tested substrate after 30 seconds contact time. Higher numbers indicate better oil repellency.

In general, an oil repellency of minimum 1 is desirable.

Water Repellency

The water repellency (WR) of a treated substrate is measured using a water-isopropyl alcohol test liquid, and is expressed in terms of the "WR" rating of the treated substrate. Treated substrates which are penetrated by or resistant only to a 100% water-0% isopropyl alcohol liquid, the least penetrating of the test liquids, are given a rating of 0, whereas treated substrates resistant to a 0% water-100% isopropyl alcohol test liquids, the most penetrating of the test mixtures, are given a rating of 10. Other intermediate values are determined by use of another water-isopropyl alcohol test liquid, in which the percentage amounts of water and isopropyl alcohol are each multiples of 10. The WR rating corresponds to the most penetrating test liquid which does not penetrate or wet the substrate surface after 15 seconds contact.

In general, a water repellency rating of 2 or greater is desirable.

Bally Penetrometer

For the testing of the shoe leather uppers for water repellency, a Bally penetrometer Model 5023 (a standardized dynamic testing machine for shoe upper leather) was used. In this test, the test piece was alternatively buckled and stretched by the machine, like an upper leather in actual use, while in contact with water on one side. The values measured in this test are:
1. the time until water first penetrates from one side of the test piece of treated leather to the other (said time is, for untreated leather, typically less than 15 minutes), and
2. the weight percent increase of the test piece caused by water absorption during the test (said weight increase, for untreated leather, is typically greater than 100% after one hour).

Abraded Oil and Slater Repellency

The repellency of an abraded treated substrate is measured on 5 cm × 12.5 cm test pieces of treated substrate which has been abraded using 10 back and forth rubs over a 5-second period with abrasive paper ("WE-TORDRY-TRI-M-ITE" No600C) in an AATCC crockmeter (Model CM-1). The above-described OR and WR repellency tests are performed on the abraded test pieces and the repellency ratings recorded as Abraded Oil Repellency (AOR) and Abraded Water Repellency (AWR) values.

Static Oil Absorption

Static oil absorption is a test designed to measure the degree of resistance of drum-treated leather to absorption of oil under static conditions. A 50×50 mm test piece is weighed and held upright in a beaker of Nujol ™ mineral oil so that the upper edge of the piece is 6 mm below the oil surface. After a 10 minute immersion period, the test piece is removed, surface oil lightly blotted off with absorbent paper, and reweighed.

Results are recorded as percent oil absorbed, using the formula:

$$\left( \frac{W2 - W1}{W1} \right) \times 100 = \%.$$

Where W1 is original weight of the piece and W2 is weight of the piece after immersion.

EXAMPLE 1

A three-necked glass reaction flask was charged with 100 g of an α,ω-succinic anhydride polydimethylsiloxane (0.60 milliequivalents/g anhydride, available from Wacker Chemie Co. as SLM 50240/2), 33.4 g (0.06 mol) of N-methyl-N-(2-hydroxyethyl)perfluorooctanesulfonamide, 125 g dry toluene and 1 g pyridine as catalyst. The contents of the flask were heated, and maintained for 4 hours at 100° C. The ester formation was followed by Fourier Transform Infra Red spectroscopy, by observing the- anhydride absorption at 1789 cm-1. When the reaction was completed, toluene was stripped from the reaction product under reduced pressure. After cooling the reaction product to 60° C., 105 g 2-butoxyethanol and 105 g deionized water were added. Upon stirring, a milky white emulsion was obtained with a pH value of 3 to 4. This emulsion was then neutralized with ammonia to a pH of 7.5. The milky white emulsion became a clear yellowish solution during the neutralization. This solution contained 40% by weight, α,ω-fluoroaliphatic- and carboxy-substituted polydimethylsiloxane of this invention, with the formula:

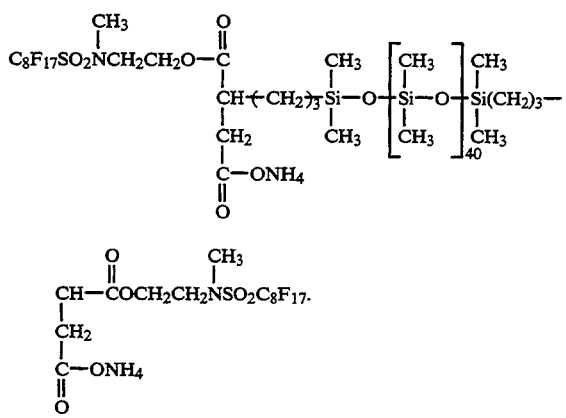

The general structure was indicated by Fourrier Transform Infra Red Spectroscopy.

EXAMPLES 2-6

Five different polysiloxanes of this invention were prepared by the same procedure used in Example 1 but using the fluorochemical alcohols and difunctional polydimethyl siloxanes as set forth in Table 1. The resulting polysiloxanes fall within the scope of Formula II.

TABLE I

| Ex. No. | Fluorochemical alcohol reactant | Number of siloxy units, n, in, α,ω-succinic anhydride functional polydimethylsiloxane reactant |
|---|---|---|
| 2 | $C_8F_{12}SO_2N(CH_3)CH_2CH_2OH$ | 10 |
| 3 | $C_8F_{17}SO_2N(CH_3)CH_2CH_2OH$ | 25 |
| 4 | $C_8F_{17}SO_2N(CH_3)CH_2CH_2OH$ | 100 |
| 5 | $C_{10}F_{21}CH_2CH_2OH$ | 40 |
| 6 | $C_8F_{17}SO_2N(CH_3)CH_2CH_2OCH_2-CH-OH$<br>$\qquad\qquad\qquad\qquad\qquad\qquad\quad\ \ |$<br>$\qquad\qquad\qquad\qquad\qquad\qquad\ \ CH_2Cl$ | 40 |

EXAMPLE 7 to 11

Six polysiloxane products of this invention were prepared with the method described in Example 1 but the 2-butoxyethanol was replaced by other solvents (listed in Table II), N-methyl N-(2-hydroxyethyl) perfluorooctanesulfonamide was used as the fluorochemical alcohol reactant, and the α,ω-succinic anhydride polydimethylsiloxane used had about 25 siloxy units.

TABLE II

| Example | Solvent | % Solvent | % Water |
|---|---|---|---|
| 7 | Propyleneglycol monomethylether | 50 | 50 |
| 8 | Propyleneglycol monoethylether | 50 | 50 |
| 9 | Ethyleneglycol monobutylether | 50 | 50 |
| 10 | Isopropanol | 50 | 50 |

TABLE II-continued

| Example | Solvent | % Solvent | % Water |
|---|---|---|---|
| 11 | Isopropanol | 25 | 75 |

EXAMPLES 12-14

Three polysiloxane products of this invention were prepared with the same general procedure as described in Example 1 but the neutralization of the carboxylic acid group to a pH value of 7,5 was done with the bases set forth in Table III instead of ammonia.

TABLE III

| Example | Based Used |
|---|---|
| 12 | Triethylamine |
| 13 | Morpholine |
| 14 | KOH |

EXAMPLE 15

A three necked glass reaction flask was charged with 7.50 g of an α,ω-succinic anhydride polydimethylsiloxane (1.03 milliequivalents/g anhydride, available from Wacker Chemie Co. as SLM 50240/4), 4.36 g N-ethyl N-(2-aminoethyl)perfluorooctane sulfonamide. The contents of the flask were heated, and maintained for 4 hours at 65° C. After these 4 hours no residual anhydride absorption at 1789 cm$^{-1}$ in the Fourier Transform Infrared Spectrum was found, indicating that the reaction was completed. After cooling the reaction product to 40° C., 0.75 g triethyl amine was added to neutralize the carboxylic acid, the product mixture was stirred for another 10 minutes. The α,ω-fluoroaliphatic- and carboxy-substituted polydimethyl siloxane of this invention was then diluted with 24.0 g ethylene glycol monobutylether and 24.0 g deionized water. This dilution resulted in a 20.8 weight percent slightly viscous polysiloxane solution of this invention. The pH of the solution was 8.

EXAMPLE 16

A glass reaction flask was charged with 15.0 g of a α,ω-succinic anhydride polydimethylsiloxane (1.03 milliequivalent/g anhydride, available from Wacker Chemie Co. as SLM 50240/4), 9.0 g $C_{10}F_{21}CH_2CH_2SH$, 1.5 g triethylamine and 10.0 g acetone. The reaction flask was closed, and the contents of the flask were heated, and maintained for 4 hours at 80° C., after these 4 hours, the Fourier Transform Infrared Spectrum showed no residual anhydride absorption at 1789 cm$^{-1}$, and the typical thioester absorption at 1695 cm$^{-1}$ was found. The product mixture was cooled and diluted with 92.0 g acetone. This resulted in a 20% by weight solution of the polysiloxane of this invention.

EXAMPLE 17

15 g of the undiluted, toluene-stripped, polysiloxane product prepared in Example 1 was diluted with 22.5 g ethylacetate, resulting in a 40% by weight solution of the polysiloxane ("Solution A").

55 g deionized water was blended with 5 g ethyleneglycol and 3.0 g 25% NH$_4$OH to produce a solution ("Solution B").

Solutions A and B were heated to 50° C. and poured together under vigorous stirring, and the resulting mixture was then treated by ultrasonic waves for 6 minutes, after this treatment, the Ethylacetate was removed from the mixture by vacuum distillation at 55° C. After removal of all ethylacetate, a storage stable microdispersion of pH 7 was obtained. The dispersion contained 20% by weight of polysiloxane of this invention.

EXAMPLES 18-29 and COMPARATIVE EXAMPLES 1-2

Aqueous dispersions or solutions of fluoroaliphatic-containing polysiloxanes of this invention were prepared and evaluated for their effectiveness in treating leather (particularly useful for upholstery) to impart desirable surface properties thereto. The polysiloxanes of Examples 1-4, 7-14 were used for this purpose. And for purpose of comparison, two other compositions were prepared. One (Comparison Example 1) being the product disclosed in claim 3 of U.S. Pat. No. 4,160,777 (LoudAs) and the other (Comparison Example 2) being the product of U.S. Pat. No. 4,525,305 formula IX page 7. The treating compositions were applied to the leather in a bath exhaust treatment. The products were applied during the final wet production step of the leather, after the standard chrome tanning, retanning, dying and fatliquoring steps used for processing upholstery leather.

The treating compositions were added to the fatliquoring bath in amounts sufficient to provide 1.6% by weight polysiloxane solids, relative to the shaved weight of the leather. The fatliquoring bath contained a liquor amounting to 200% by weight of water relative to the shaved weight of the leather.

The bath temperature was 50° C. and the pH 4.5 at the moment of addition of treating agent. The exhaust process was continued for 30 minutes, after which the pH was lowered to 3.5 with formic acid.

After the treated leathers were dried and finished in customary manner, the OR, WR, SR, AOR, AWR tests were conducted on the grain side of the treated leather. The results are set forth in Table IV.

TABLE IV

| Example where polysiloxane product used was prepared | | Properties of treated leather | | | | | |
|---|---|---|---|---|---|---|---|
| Ex. | Ex. | OR | WR | AOR | AWR | SR | Hand |
| 18 | 1 | 1 to 2 | 3 | 1 | 2 | 100 | Soft |
| 19 | 2 | 2 to 3 | 3 | 1 | 2 | 90 | Soft |
| 20 | 3 | 3 | 5 | 2 | 3 | 100 | Soft |
| 21 | 4 | 1 | 1 | 0 | 1 | 60 | Soft |
| 22 | 7 | 2 to 3 | 2 to 3 | 2 | 2 to 3 | 100 | Soft |
| 23 | 8 | 2 to 3 | 2 to 3 | 2 | 2 to 3 | 100 | Soft |
| 24 | 9 | 1 | 2 | 0 | 2 | 100 | Soft |
| 25 | 10 | 1 | 2 | 0 | 2 | 100 | Soft |
| 26 | 11 | 1 | 2 to 3 | 1 | 2 | 100 | Soft |
| 27 | 12 | 1 | 2 | 0 | 2 | 90 | Soft |
| 28 | 13 | 2 | 1 | 0 | 1 | 100 | Soft |
| 29 | 14 | 1 | 1 | 0 | 1 | 80 | Soft |
| Comparative example | | | | | | | |
| 1 | | 0 | 1 | 0 | 0 | 70 | Dry |
| 2 | | 1 to 2 | 1 | 1 | 1 | 80 | rough, sticky |

The above results clearly demonstrate that when the polysiloxanes of this invention are applied to upholstery leather, this results in a leather with a soft hand and good oil- and water-repellent properties. The resulting overall leather properties are significantly better than for the leathers prepared with the comparative examples.

Examples 18-21 show that a wide variety in siloxane chain length can be used. Examples 22-26 demonstrate that a wide variety of cosolvents can be used to prepare the polysiloxanes of this invention. Example 27-29 show that a wide variety of bases can be used to prepare the polysiloxanes of this invention.

EXAMPLE 30 and COMPARATIVE EXAMPLE 3

Using the procedure followed in Examples 18-29, typical shoe leather was treated with an aqueous dispersion containing the polysiloxane prepared in Example 3, and for purposes of comparison the aqueous treating solution (Comparative Example 3) was prepared like that of Comparative Example 2 and also used to treat shoe leather. The performance results are listed in the following Tables V and VI.

TABLE V

| Example | Polysiloxane used | Properties of treated leather | | | | | |
|---|---|---|---|---|---|---|---|
| | | OR | WR | AOR | AWR | SR | Hand |
| 30 | Ex. 3 | 1 | 2 | 0 | 2 | 100 | Soft |
| Comp. Ex. 3 | Comp. Ex. 2 | 1 | 2 | 0 | 2 | 80 | Rough, sticky |

TABLE VI

| Example | Polysiloxane used | Bally Penetrometer Test | |
|---|---|---|---|
| | | Time | 1 hr. Absorption |
| 30 | Ex. 3 | 60' | 35% |
| Comp. Ex. 3 | Comp. Ex. 2 | 60' | 75% |

Compared to comparative Example 3, Example 30 clearly demonstrates the excellent performance of the Composition according to this invention. As well the repellent properties of the leather prepared with the polysiloxanes of this invention as the leather softness is better than for the leather prepared with the Comparative Example. Especially for shoe leather the lower % water absorption after 1 hour Bally Penetrometer test is important.

EXAMPLE 31 and COMPARATIVE EXAMPLE 4

Using the application procedure of Examples 18-29, a suede, garment-type leather was treated with an aqueous solution containing the polysiloxane product prepared in Example 1 and for purposes of comparison the solution of the product used in Comparative Example 2 was also evaluated. The performance results are listed in Table VII.

TABLE VII

| Example | Polysiloxane used | OR | WR | SR | Hand |
|---|---|---|---|---|---|
| Ex. 31 | Ex. 1 | 2 | 3 | 90 | soft, good hand |
| Comp. Ex. 4 | Comp. Ex. 2 | 5 | 4 | 80 | rough, sticky, unacceptable hand |

The results demonstrate that the polysiloxanes of this invention can be used to prepare high quality suede garment leather. Example 31 shows that the leather produced with the product of Example 1 has good overall repellency properties in combination with a soft hand, while the leather produced with the product of Comparative Example 2 has good repellencies, but an unacceptable hand. For that reason the leather of Comparative Example 4 has overall unacceptable properties.

EXAMPLES 32 to 34

The polysiloxanes of Examples 1, 5 and 6 prepared from different fluorochemical alcohols were used to treat suede shoe leather, using the application method described in Examples 18–29.

The results are set forth in Table VIII.

TABLE VIII

| Examples | Polysiloxane used | OR | WR | AOR | AWR | SR | Static oil | Hand |
|---|---|---|---|---|---|---|---|---|
| Ex. 32 | Ex. 1 | 4 | 5 | 0 | 3 | 100 | 73 | soft |
| Ex. 33 | Ex. 5 | 1 | 4 | 0 | 3 | 100 | 87 | soft |
| Ex. 34 | Ex. 6 | 3 | 6 | 5 | 3 | 100 | 65 | soft |

The results in table VIII demonstrate that different fluorochemical precursors can be used to prepare the polysiloxanes of this invention.

EXAMPLE 35 to 36 and COMPARATIVE EXAMPLES 5 and 6

Sheepskin "double face" leather was treated with aqueous solutions containing the polysiloxanes prepared in Example 1 and 3, and for comparison purpose, with treating agents like those used in Comparative Examples 1 and 2. The performance results are set forth in Table IX. The application method used is described in Examples 18–29.

TABLE IX

| Example | Polysiloxane used | OR | WR | AOR | AWR | SR | Hand |
|---|---|---|---|---|---|---|---|
| Ex. 35 | Ex. 3 | 6 | 5 | 4 | 4 | 70 | soft |
| Ex. 36 | Ex. 1 | 6 | 7 | 6 | 4 | 70 | soft |
| Comp. Ex. 5 | Comp. Ex. 1 | 5 | 4 | 5 | 4 | 70 | dry, rough |
| Comp. Ex. 6 | Comp. Ex. 2 | 6 | 7 | 7 | 5 | 70 | dry, rough |

These results demonstrate that as well the "double face" sheepskins prepared with the polysiloxanes of this invention, as the leathers prepared with the products of the Comparative Examples have good overall repellency properties, but only the leathers prepared with the polysiloxanes of this invention have a soft hand, and therefore are the only leathers with the desired properties.

EXAMPLES 37 and 38 and COMPARATIVE EXAMPLES 7 and 8

Sheepskin "nappa" leather was treated with aqueous solutions containing the polysiloxanes prepared in Examples 1 and 3, and for the purpose of comparison, with treating agents like those used in Comparative Examples 1 and 2, using the application method described in Examples 18–29.

The performance results are set forth in Table X.

TABLE X

| Example | Polysiloxane used | OR | WR | AOR | AWR | SR | Hand |
|---|---|---|---|---|---|---|---|
| Ex. 37 | Ex. 3 | 1 to 26 | 2 to 3 | 0 to 1 | 2 | 70 | soft |
| Ex. 38 | Ex. 1 | 1 to 2 | 2 | 0 to 1 | 2 | 100 | soft |
| Comp. Ex. 7 | Comp. Ex. 1 | 2 | 4 to 5 | 0 to I | 4 | 80 | dry, sticky |
| Comp. Ex. 8 | Comp. Ex. 2 | 2 | 4 | 0 to 1 | 3 | 70 | dry, sticky |

The results of Table X clearly demonstrate, that again the leathers prepared with the polysiloxanes of this invention have the desired combination of properties.

EXAMPLE 39

An aqueous solution—of the polysiloxane of this invention prepared in Example 1 was applied to a 100% Wool fabric, and a 65/35% Polyester/Cotton fabric.

The application of the polysiloxane was done by a pad application, after the application, the fabrics were dried and cured at 150° C. for 3 minutes. The application level was 0.6% polysiloxane by-weight of fabric.

The performance results are set forth in Table XI.

TABLE XI

| Fabric type | OR | WR | SR | Hand |
|---|---|---|---|---|
| 65/35 PES/CO | 1 | 2 | 70 | soft hand |
| Wool | 2 to 3 | 2 | 80 | soft hand |

The results of Table XI demonstrate that the polysiloxanes of this invention also impart oil- and water-repellency in combination with a soft hand to textile substrates.

Various modifications and alterations of this invention will become apparent to those skilled in the art without departing from the scope and spirit of this invention.

What is claimed is:

1. A polysiloxane wherein said polysiloxane has either the formula

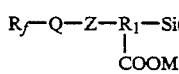

or the formula

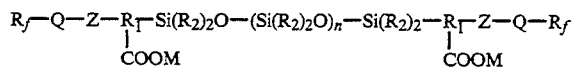

wherein

R_f represents a fluoroaliphatic group;
Q represents a covalent bond or a linking group;
Z is

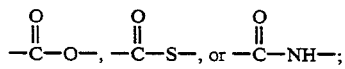

each $R_1$ and $R_2$ is independently a linear, branched, or cyclic aliphatic group, or an aromatic group;
n is an integer greater than 1;
M is H, Na, K, Li, or $NR_3R_4R_5R_6$ with $R_3$, $R_4$, $R_5$, $R_6$ being independently H, a linear, branched or cyclic saturated aliphatic group or an aromatic group.

2. The polysiloxane of claim 1 wherein Q is —R'— or —$SO_2N(R)R'$— where R is hydrogen or an alkyl group with 1 to 6 carbon atoms and R' is an alkylene group having from 1 to 15 carbon atoms.

3. The polysiloxane of claim 1 wherein $R_1$ is a branched, linear or cyclic aliphatic group with 2 to 10 carbon atoms.

4. The polysiloxane of claim 1 wherein $R_2$ is a methyl, ethyl, n-propyl, isopropyl or phenyl group.

5. The polysiloxane of claim 1 wherein n is 10–100.

6. The polysiloxane of claim 1 wherein said polysiloxane is

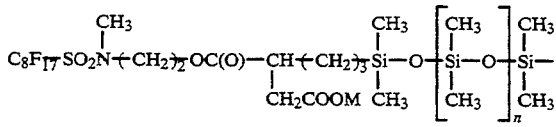

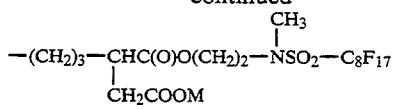

wherein n is 20 to 60.

7. The polysiloxane of claim 1 wherein said polysiloxane is

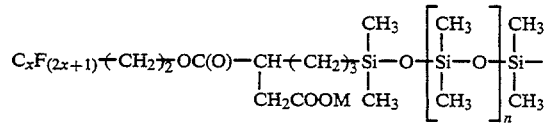

wherein n is 20 to 60, and x is 6 to 14.

8. The polysiloxane of claim 7 wherein x is 8.

9. A method for the preparation of the polysiloxane of claim 1 comprising the step of reacting a polyorganosiloxane substituted dicarboxylic anhydride with a compound selected from the group consisting of fluoroaliphatic group-containing alcohols, mercaptans, and amines.

10. The method of claim 9 further comprising the step of partially or completely neutralizing the resulting reaction product with an alkaline substance to form salts.

11. The method of claim 10 wherein the alkaline is ammonia.

12. Method for imparting water-, oil-, soil-repellency and a soft hand to leather, comprising the step of treating leather with a treating composition comprising the polysiloxane of claim 1.

13. The method of claim 12 wherein the imparting is done in the fluorochemical drum treatment during the tanning process of leather.

14. A fibrous substrate having at least one surface with improved water-, oil-, and soil-repellency having on said surface an amount of the polysiloxane of claim 1 sufficient to impart these properties thereto.

15. The fibrous substrate of claim 14 wherein said amount of the polysiloxane is such that 0.01% to 5% by weight of fluorine is present.

16. The fibrous substrate of claim 14 wherein the substrate is leather.

17. The fibrous substrate of claim 14 wherein said amount of the polysiloxane is such that 0.05 to 2% by weight of fluorine is present.

* * * * *

UNITED STATES PATENT AND TRADEMARK OFFICE
CERTIFICATE OF CORRECTION

PATENT NO. : 5,385,999
DATED : January 31, 1995
INVENTOR(S) : Claude D'Anvers and Dirk M. Coppens It is certified that error appears in the above-indentified patent and that said Letters Patent is hereby corrected as shown below:

Col. 18, line 19, "x is S" should read --x is 8--.

Signed and Sealed this

Twentieth Day of June, 1995

Attest:

BRUCE LEHMAN

Attesting Officer

Commissioner of Patents and Trademarks